(12) United States Patent
Takechi et al.

(10) Patent No.: US 12,377,928 B2
(45) Date of Patent: Aug. 5, 2025

(54) SADDLE-RIDE TYPE VEHICLE WITH MICROPHONE LOCATED ON OPERATION-PORTION SUPPORT PORTION

(71) Applicant: HONDA MOTOR CO., LTD., Tokyo (JP)

(72) Inventors: Ryo Takechi, Tokyo (JP); Masaharu Senno, Tokyo (JP); Kohei Noguchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 331 days.

(21) Appl. No.: 17/926,783

(22) PCT Filed: Feb. 8, 2021

(86) PCT No.: PCT/JP2021/004596
§ 371 (c)(1),
(2) Date: Nov. 21, 2022

(87) PCT Pub. No.: WO2021/240901
PCT Pub. Date: Dec. 2, 2021

(65) Prior Publication Data
US 2023/0202601 A1 Jun. 29, 2023

(30) Foreign Application Priority Data
May 28, 2020 (JP) .................. 2020-093373

(51) Int. Cl.
*B62J 17/02* (2006.01)
*B62J 17/04* (2006.01)
(Continued)

(52) U.S. Cl.
CPC ............ *B62J 17/02* (2013.01); *B62J 17/04* (2013.01); *B62J 45/10* (2020.02); *B62J 50/22* (2020.02)

(58) Field of Classification Search
CPC ............ B62J 17/02; B62J 45/10; B62J 17/10
See application file for complete search history.

(56) References Cited

U.S. PATENT DOCUMENTS

| 2,636,652 | A | * | 4/1953 | Foringer | ................ H05K 11/02 224/450 |
| 2005/0123148 | A1 | * | 6/2005 | Ohler | ..................... B60R 11/02 381/86 |
| 2023/0352037 | A1 | * | 11/2023 | Elgee | ..................... H04R 1/326 |

FOREIGN PATENT DOCUMENTS

| JP | S63-213419 | | 9/1988 |
| JP | 3137637 B2 | * | 2/2001 |

(Continued)

OTHER PUBLICATIONS

International Preliminary Report on Patentability corresponding to International application No. PCT/JP2021/004596 dated Nov. 17, 2022 (6 pages).

(Continued)

*Primary Examiner* — Daniel J Colilla
(74) *Attorney, Agent, or Firm* — Rankin, Hill & Clark LLP

(57) ABSTRACT

In a saddle-ride type vehicle, a microphone can capture the speech of a rider easily, and a display portion is easily visible to the rider. In the saddle-ride type vehicle, which includes: a microphone for capturing sound, the microphone being placed forward of a seat for a rider; a display portion for displaying a condition of the vehicle; and a handlebar for steering a front wheel, the microphone is spaced apart from the display portion and placed rearward of the display portion.

8 Claims, 6 Drawing Sheets

(51) Int. Cl.
*B62J 45/10* (2020.01)
*B62J 50/22* (2020.01)

(56) References Cited

FOREIGN PATENT DOCUMENTS

JP        5007194 B2 *  8/2012
WO    2017/099213      6/2017

OTHER PUBLICATIONS

International Search Report, PCT Application No. PCT/JP2021/004596, Date of mailing: Apr. 27, 2021, 4 pages.
Written Opinion of the International Searching Authority dated Apr. 27, 2021 filed in PCT/JP2021/004596, 4 pages.

* cited by examiner

SADDLE-RIDE TYPE VEHICLE WITH MICROPHONE LOCATED ON OPERATION-PORTION SUPPORT PORTION

TECHNICAL FIELD

The present invention relates to a saddle-ride type vehicle.

BACKGROUND ART

A known conventional saddle-ride type vehicle includes a microphone for capturing sound, a display portion (meters) for displaying a condition of the vehicle, and a handlebar for steering a front wheel (see Patent Literature 1, for example). In Patent Literature 1, a microphone is integrated in a display portion.

CITATION LIST

Patent Literature

Patent Literature 1

Japanese Patent Laid-Open No. S63-213419

SUMMARY OF INVENTION

Technical Problem

In the conventional saddle-ride type vehicle described above, the microphone, which is placed in the display portion, is far from the rider, and this may inhibit the microphone from capturing sound. If the display portion including the microphone is moved rearward to bring the microphone closer to the rider, the display portion may be too close to the rider, inhibiting the rider from seeing the display portion.

The present invention has been achieved in view of the circumstances described above and has an object of facilitating a microphone capturing the speech of a rider and making the display portion to be easily visible to the rider in a saddle-ride type vehicle.

Solution to Problem

Japanese Patent Application No. 2020-093373 filed on May 28, 2020 is incorporated herein in its entirety.

A saddle-ride type vehicle includes: a microphone (50) for capturing sound, the microphone (50) being located forward of a seat (14) for a rider; a display portion (30) for displaying a condition of the vehicle; and a handlebar (20) for steering a front wheel (2), and the microphone (50) is spaced apart from the display portion (30) and located rearward of the display portion (30).

Furthermore, in the configuration described above, a windscreen (25) having a plate shape and located forward of the display portion (30) is further included, and a distance (D2) between the microphone (50) and the seat (14) in a horizontal direction may be smaller than a distance (D1) between the windscreen (25) and the microphone (50) in a direction normal to the windscreen (25).

Furthermore, in the configuration described above, the handlebar (20) includes grip portions (20c) to be held by the rider, and the microphone (50) may be located rearward of a steering shaft (20a) of the handlebar (20) and below the grip portions (20c) when seen from a side of the vehicle.

Furthermore, in the configuration described above, a tilted portion (60) tilted downward and rearward is provided, and the microphone (50) may be located in the tilted portion (60).

Furthermore, in the configuration described above, the microphone (50) may be located in a center portion of the saddle-ride type vehicle in a vehicle width direction.

Furthermore, in the configuration described above, an operator (37b) extending upward is located forward of the microphone (50), and a height of the operator (37b) may be greater than a height of the microphone (50).

Furthermore, in the configuration described above, a wind deflector (27) extending outward in a vehicle width direction are located forward of the microphone (50), and the microphone (50) may be located within a width (H) of the wind deflector (27) in a height direction when seen from a side of the vehicle.

Furthermore, in the configuration described above, the handlebar (20) is configured to be steered left and right relative to a vehicle body front portion (10a) located forward of the seat (14), and the microphone (50) may be supported by the vehicle body front portion (10a).

Furthermore, in the configuration described above, the microphone (50) may be located below a lower end portion (25b) of the windscreen (25) and rearward of a rear end portion (25a) of the windscreen (25).

Advantageous Effects of Invention

A saddle-ride type vehicle includes: a microphone for capturing sound, the microphone being located forward of a seat for a rider; a display portion for displaying a condition of the vehicle; and a handlebar for steering a front wheel, and the microphone is spaced apart from the display portion and located rearward of the display portion.

In this configuration, the microphone is spaced apart from the display portion and located rearward of the display portion; thus, the microphone is close to the rider on the seat and can thereby capture the speech of the rider easily. Furthermore, the display portion is spaced apart from the microphone and placed forward of the microphone; thus, the display portion is easily visible to the rider.

Furthermore, in the configuration described above, a windscreen having a plate shape and located forward of the display portion is further included, and a distance between the microphone and the seat in a horizontal direction may be smaller than a distance between the windscreen and the microphone in a direction normal to the windscreen.

In this configuration, the distance between the windscreen and the microphone can be increased, so that the air stream flowing along the windscreen during travel has a reduced effect on the microphone capturing sound. Thus, the microphone can capture the speech of the rider easily.

Furthermore, in the configuration described above, the handlebar includes grip portions to be held by the rider, and the microphone may be located rearward of a steering shaft of the handlebar and below the grip portions when seen from a side of the vehicle.

In this configuration, the handlebar and the arms of the rider holding the grip portions are available as shields against wind and can inhibit air stream noise from being captured by the microphone.

Furthermore, in the configuration described above, a tilted portion tilted downward and rearward is provided, and the microphone may be located in the tilted portion.

In this configuration, the air stream is weakened at the tilted portion, which is tilted downward and rearward. Thus, placing the microphone in the tilted portion can inhibit the noise due to the air stream and thereby facilitate the microphone capturing the speech of the rider.

Furthermore, in the configuration described above, the microphone may be located in a center portion of the saddle-ride type vehicle in a vehicle width direction.

In this configuration, the center portion in the vehicle width direction is not susceptible to the air stream, and thus, placing the microphone in the center portion in the vehicle width direction can inhibit the noise due to the air stream.

Furthermore, in the configuration described above, an operator extending upward is located forward of the microphone, and a height of the operator may be greater than a height of the microphone.

In this configuration, the operator is available as a shield against wind for the microphone and can inhibit the noise due to the air stream.

Furthermore, in the configuration described above, a wind deflector extending outward in a vehicle width direction are located forward of the microphone, and the microphone may be located within a width of the wind deflector in a height direction when seen from a side of the vehicle.

In this configuration, the wind deflector is available as shields against wind for the microphone and can inhibit the noise due to the air stream.

Furthermore, in the configuration described above, the handlebar is configured to be steered left and right relative to a vehicle body front portion located forward of the seat, and the microphone may be supported by the vehicle body front portion.

In this configuration, the position of the microphone is not changed by the handlebar being steered left and right, so that the microphone can capture the speech of the rider stably.

Furthermore, in the configuration described above, the microphone may be located below a lower end portion of the windscreen and rearward of a rear end portion of the windscreen.

In this configuration, the air stream flowing along the windscreen during travel is inhibited from reaching the microphone, so that the noise due to the air stream can be inhibited.

DESCRIPTION OF EMBODIMENT

Figure 1:
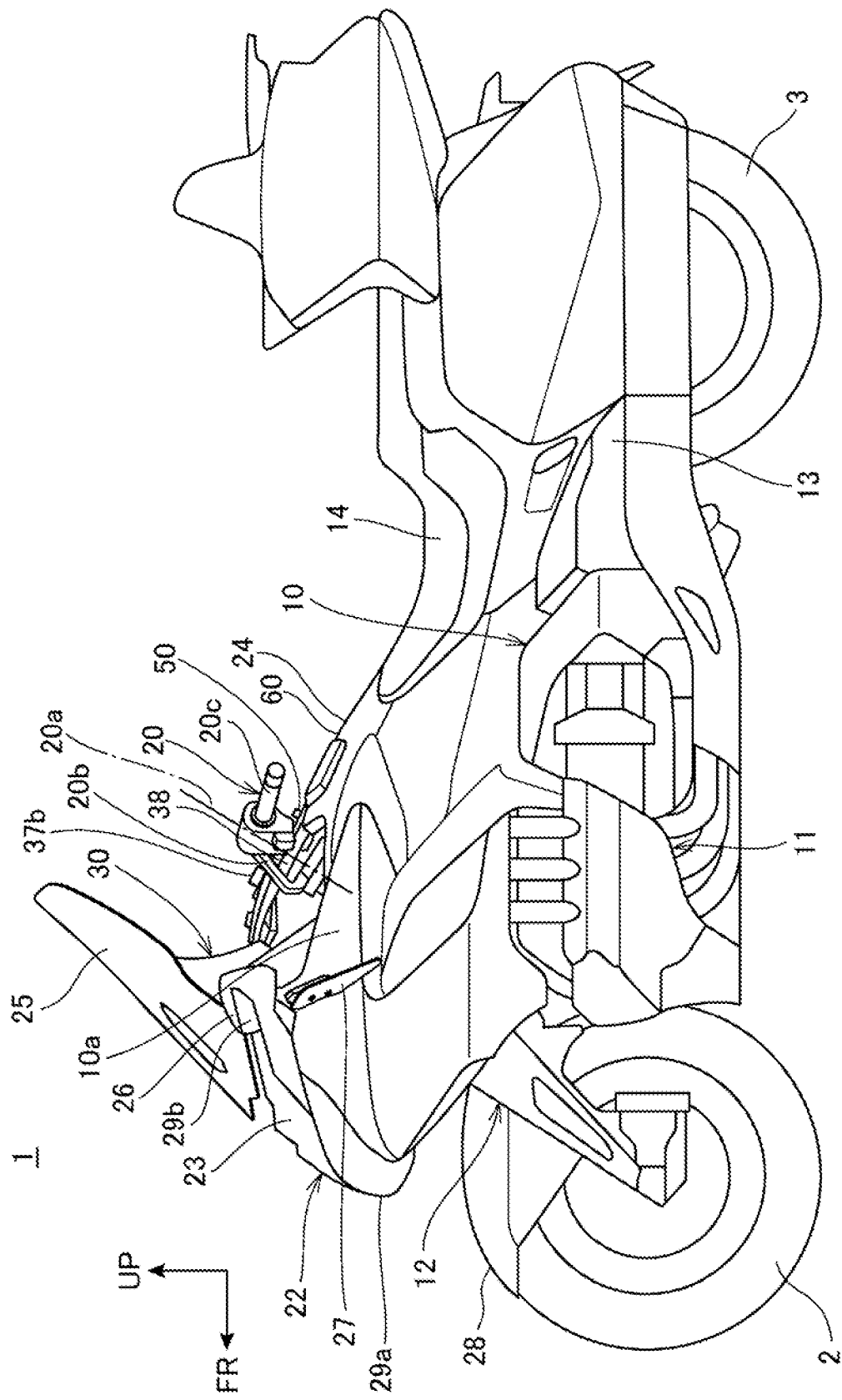
FIG. 1 is a left side view of a two-wheeled motor vehicle according to an embodiment of the present invention.

An embodiment of the present invention is described below with reference to the drawings. Directions that appear herein, including front, rear, left, right, up, and down, are relative to a vehicle body, unless otherwise specified. Reference signs FR, UP, and LH that appear in the drawings indicate front, up, and left, respectively, relative to the vehicle body.

Figure 2:
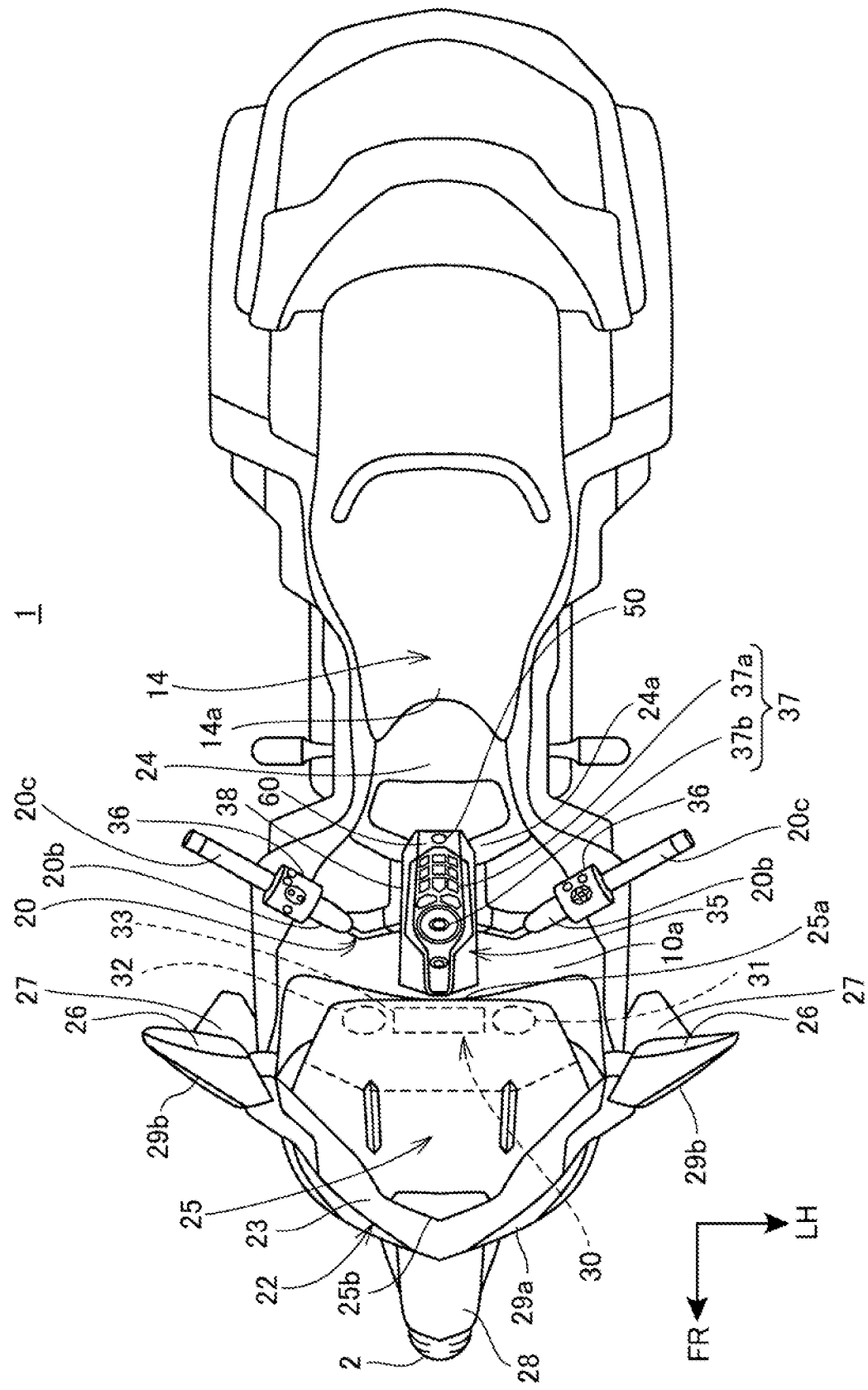
FIG. 2 is a plan view seen from above of the two-wheeled motor vehicle.
Figure 3:
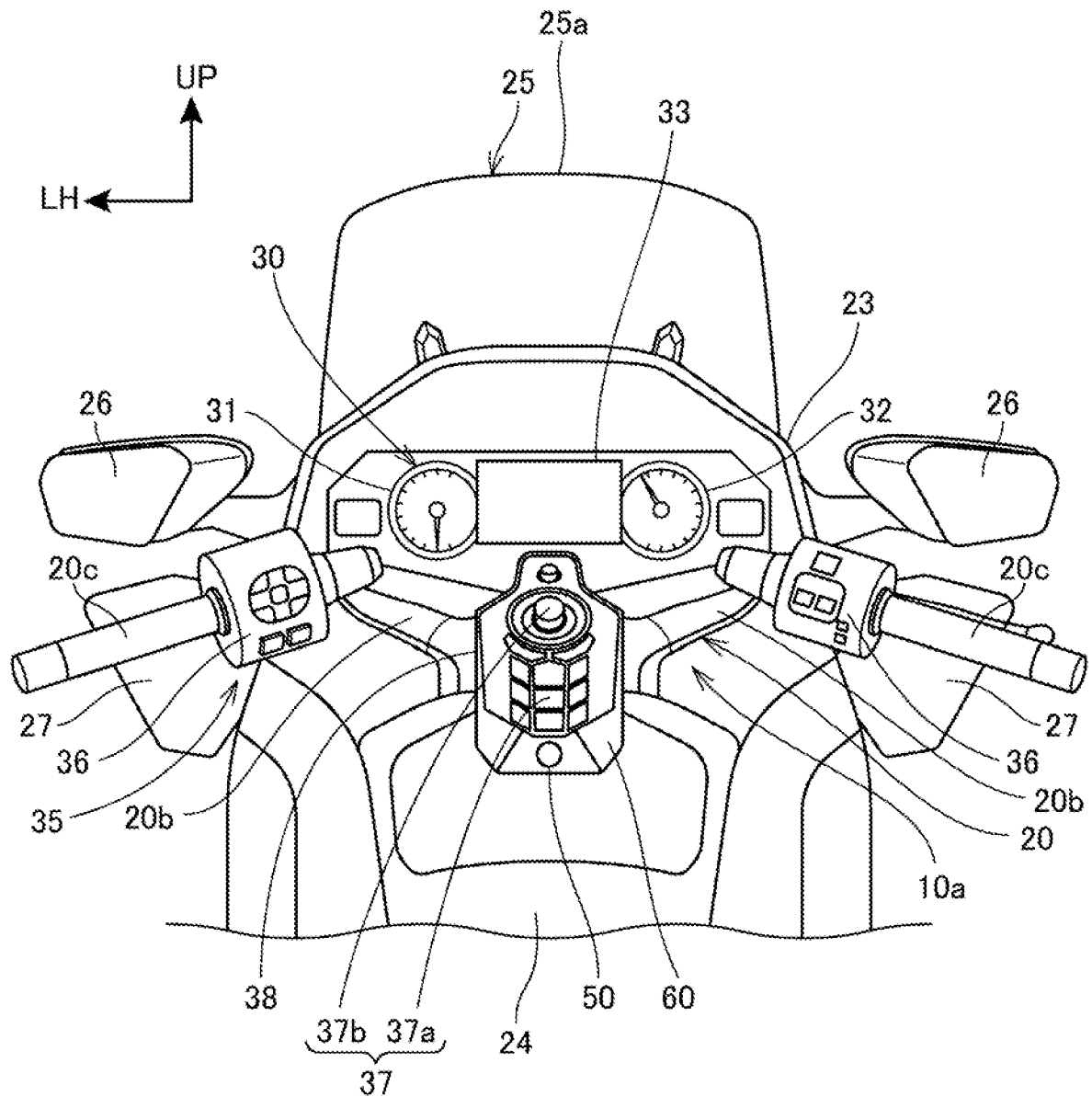
FIG. 3 is a diagram of a front portion of the two-wheeled motor vehicle as seen from behind.

FIG. 1 is a left side view of a two-wheeled motor vehicle 1 according to an embodiment of the present invention. FIG. 2 is a plan view seen from above of the two-wheeled motor vehicle 1. FIG. 3 is a diagram showing a front portion of the two-wheeled motor vehicle 1 as seen from behind.

The two-wheeled motor vehicle 1 is a vehicle in which a power unit, namely an engine 11, is supported by a vehicle body frame 10; a steering system 12 supporting a front wheel 2 in a steerable manner is supported by a front end portion of the vehicle body frame 10 in such a manner that the steering system 12 can be steered left and right; and a swing arm 13 supporting a rear wheel 3 is placed at a rear portion of the vehicle body frame 10. The rear wheel 3 is a driving wheel driven by the engine 11.

The two-wheeled motor vehicle 1 is a saddle-ride type vehicle, which a rider straddles, sitting on a seat 14, and the seat 14 is placed above the rear portion of the vehicle body frame 10. The power unit may be an electric motor.

The seat 14 is supported from below by the vehicle body frame 10 and placed between the front wheel 2 and the rear wheel 3 in a vehicle front-rear direction. The seat 14 is placed above and rearward of the engine 11.

The front wheel 2 is supported by a lower end portion of the steering system 12. A handlebar 20 for steering is placed at an upper end portion of the steering system 12. The handlebar 20 is placed forward of and above the seat 14. The handlebar 20 is supported by a vehicle body front portion 10a located forward of the seat 14 in the vehicle body and is steered left and right relative to the vehicle body front portion 10a.

The handlebar 20 turns about a steering shaft 20a placed at the vehicle body front portion 10a. As with the front wheel 2, the steering shaft 20a is located at a middle (center) of a vehicle width of the two-wheeled motor vehicle 1. The steering shaft 20a is a part of the steering system 12 and is tilted rearward relative to a vertical direction when viewed from a side of the vehicle.

The handlebar 20 includes: handle portions 20b each having a rod shape, the respective handle portions 20b extending outward to the left and right relative to the steering shaft 20a located at the middle of the vehicle width; and a left and right pair of grip portions 20c placed at respective outer end portions of the handle portions 20b in a vehicle width direction. The left and right grip portions 20c are to be held by a rider sitting on the seat 14 with the rider's respective left and right hands to steer the handlebar 20.

The two-wheeled motor vehicle 1 includes a vehicle body cover 22 that covers the vehicle body including the vehicle body frame 10. The vehicle body cover 22 includes: a front cover 23 at a front portion of the vehicle body cover 22, the front cover 23 covering an upper portion of the steering system 12 and the front end portion of the vehicle body frame 10 from the front and from the sides; and a center cover 24 covering a portion of the vehicle body between the handlebar 20 and the seat 14 from above and from the sides. The vehicle body front portion 10a includes the vehicle body frame 10 and the vehicle body cover 22.

The two-wheeled motor vehicle 1 includes a windscreen 25 located forward of the handlebar 20, the windscreen 25 extending upward relative to the front cover 23.

The two-wheeled motor vehicle 1 includes a left and right pair of rearview mirrors 26 extending outward in the vehicle width direction from respective left and right side portions of the front cover 23. The left and right rearview mirrors 26 are placed outward of the windscreen 25 in the vehicle width direction. The rearview mirrors 26 are located near a lower end portion of the windscreen 25.

The two-wheeled motor vehicle 1 also includes a left and right pair of wind deflectors 27 extending outward in the vehicle width direction from the respective left and right side portions of the front cover 23. Each of the wind deflectors 27 is a plate member placed with its thickness direction oriented in the vehicle front-rear direction. The wind deflectors 27 are located directly below the respective left and right rearview mirrors 26. The left and right wind deflectors 27 are placed outward of the windscreen 25 in the vehicle width direction. The left and right wind deflectors 27 are located forward of and below the respective grip portions 20c when seen from the side of the vehicle.

A front fender 28 covering the front wheel 2 from above is supported by a lower portion of the steering system 12.

The two-wheeled motor vehicle 1 includes lighting devices including a headlight 29a and a left and right pair of turn signal indicators 29b. The headlight 29a is placed at a front end portion of the front cover 23, and the turn signal indicators 29b are placed on respective front faces of the left and right rearview mirrors 26.

The two-wheeled motor vehicle 1 includes a display portion 30 located rearward of the windscreen 25, the display portion 30 being configured to display a condition of the two-wheeled motor vehicle 1. The display portion 30 is placed forward of and above the handlebar 20. The display portion 30 is a meter unit that displays information relating to the two-wheeled motor vehicle 1, such as vehicle speed of the two-wheeled motor vehicle 1.

The display portion 30 includes: instruments 31 and 32 for displaying information (vehicle speed, engine rpm, and the like) relating to the two-wheeled motor vehicle 1; and a monitor 33 for displaying different types of information. The monitor 33 includes a publicly known display panel, such as a liquid crystal panel, facing the rider located rearward of and above the monitor 33, and displays different types of information including information on the two-wheeled motor vehicle 1.

The two-wheeled motor vehicle 1 includes an operation portion 35 for the rider to operate components of the two-wheeled motor vehicle 1, and the operation portion 35 includes: a pair of handlebar-side operation portions 36 placed at the respective left and right handle portions 20b; and a central operation portion 37 placed rearward of the display portion 30 and at the middle of the vehicle width. The operation portion 35 is placed forward of the seat 14.

The operation portion 35 allows operation of, for example, lighting devices such as the headlight 29a and the turn signal indicators 29b, an audio system mounted on the two-wheeled motor vehicle 1, a navigation system mounted on the two-wheeled motor vehicle 1, drive modes of the engine 11, electronically controlled suspensions of the front wheel 2 and the rear wheel 3 to change their characteristics, and different operation menus displayed on the display portion 30.

The two-wheeled motor vehicle 1 includes an operation-portion support portion 38 having a plate shape and extending forward from a front end portion 24a of a middle (center) portion of the center cover 24 in the vehicle width direction. The operation-portion support portion 38 extends from the center cover 24, passing above the handlebar 20 and connecting to a rear end portion of the display portion 30. The operation-portion support portion 38 is located above a middle portion of the handlebar 20 in the vehicle width direction, covering the steering shaft 20a from above. The operation-portion support portion 38 is a part of the vehicle body cover 22.

The central operation portion 37 is placed on the operation-portion support portion 38 and is located between the center cover 24 and the display portion 30.

The central operation portion 37 includes: a press operation portion 37a that includes a plurality of operation buttons; and an operator 37b having a stick shape and protruding upward from the operation-portion support portion 38.

The operator 37b is placed forward of the press operation portion 37a and extends higher than the press operation portion 37a. The operator 37b is located at the middle of the vehicle width.

The operator 37b allows operation of components of the two-wheeled motor vehicle 1 through a tilting operation that tilts the operator 37b in an arbitrary direction or a rotating operation that rotates the operator 37b about an axis of the operator 37b.

The two-wheeled motor vehicle 1 includes a microphone 50 for capturing sound. The microphone 50 is placed forward of the seat 14 and captures the speech of the rider sitting on the seat 14.

The two-wheeled motor vehicle 1 allows operation of components of the two-wheeled motor vehicle 1 on the basis of speech captured by the microphone 50.

Figure 4:
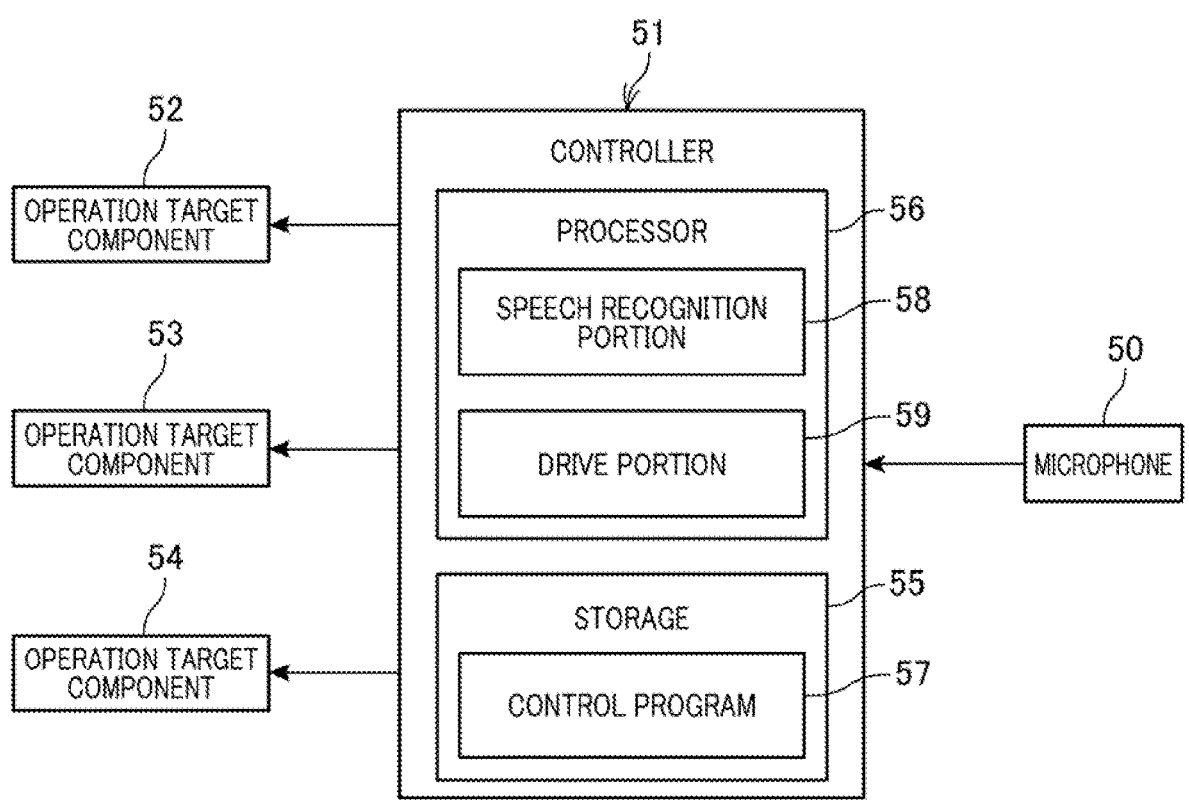
FIG. 4 is a block configuration diagram showing a configuration for operating components of the two-wheeled motor vehicle by use of a microphone.

FIG. 4 is a block configuration diagram showing a configuration for operating components of the two-wheeled motor vehicle 1 by the use of the microphone 50.

With reference to FIG. 4, the two-wheeled motor vehicle 1 includes a controller 51. The controller 51 is connected to the microphone 50 and a plurality of operation target components 52, 53, and 54 to be operated based on the speech captured by the microphone 50.

The controller 51 is also connected to the operation portion 35 (FIG. 3) and the display portion 30 (FIG. 3), although this connection is not shown in FIG. 4. The controller 51 displays indication relating to an operation of the operation portion 35 on the display portion 30. The controller 51 also operates components of the two-wheeled motor vehicle 1 on the basis of the operation of the operation portion 35.

The controller 51 is a computer device that includes a storage 55 and a processor 56. The storage 55 includes a memory such as a ROM and a RAM. The term ROM is short for Read Only Memory. The term RAM is short for Random Access Memory.

The storage 55 stores control programs 57 to be executed by the processor 56. The control programs 57 include an application program. The storage 55 also stores data to be processed when the processor 56 executes a computer program, and data resulting from the processing.

The processor 56 includes a CPU, a microcomputer, and/or, a DSP, and controls elements of the controller 51 by executing programs. The term CPU is short for Central Processing Unit. The term DSP is short for Digital Signal Processor.

The controller 51 achieves different functional constituent elements by the processor 56 executing control programs 57 stored in the storage 55. The controller 51 in the present embodiment includes a speech recognition portion 58 and a drive portion 59, which are functional constituent elements.

The speech recognition portion 58 and the drive portion 59 are functions achieved by the processor 56 executing application programs stored in the storage 55.

The speech recognition portion 58 recognizes speech that is input to the microphone 50, as a speech signal.

The drive portion 59 drives the operation target component 52, 53, or 54 on the basis of the speech signal recognized by the speech recognition portion 58.

The operation target components 52, 53, and 54 are, for example, a lighting device, such as the headlight 29a and the turn signal indicators 29b; an audio system mounted on the two-wheeled motor vehicle 1; and the engine 11, respectively. These are, however, not limitations on the operation target components.

When the speech recognition portion 58 of the controller 51 recognizes speech of the rider input to the microphone 50 as "right turn," for example, the drive portion 59 flashes the right side turn signal indicator 29b.

Figure 5:
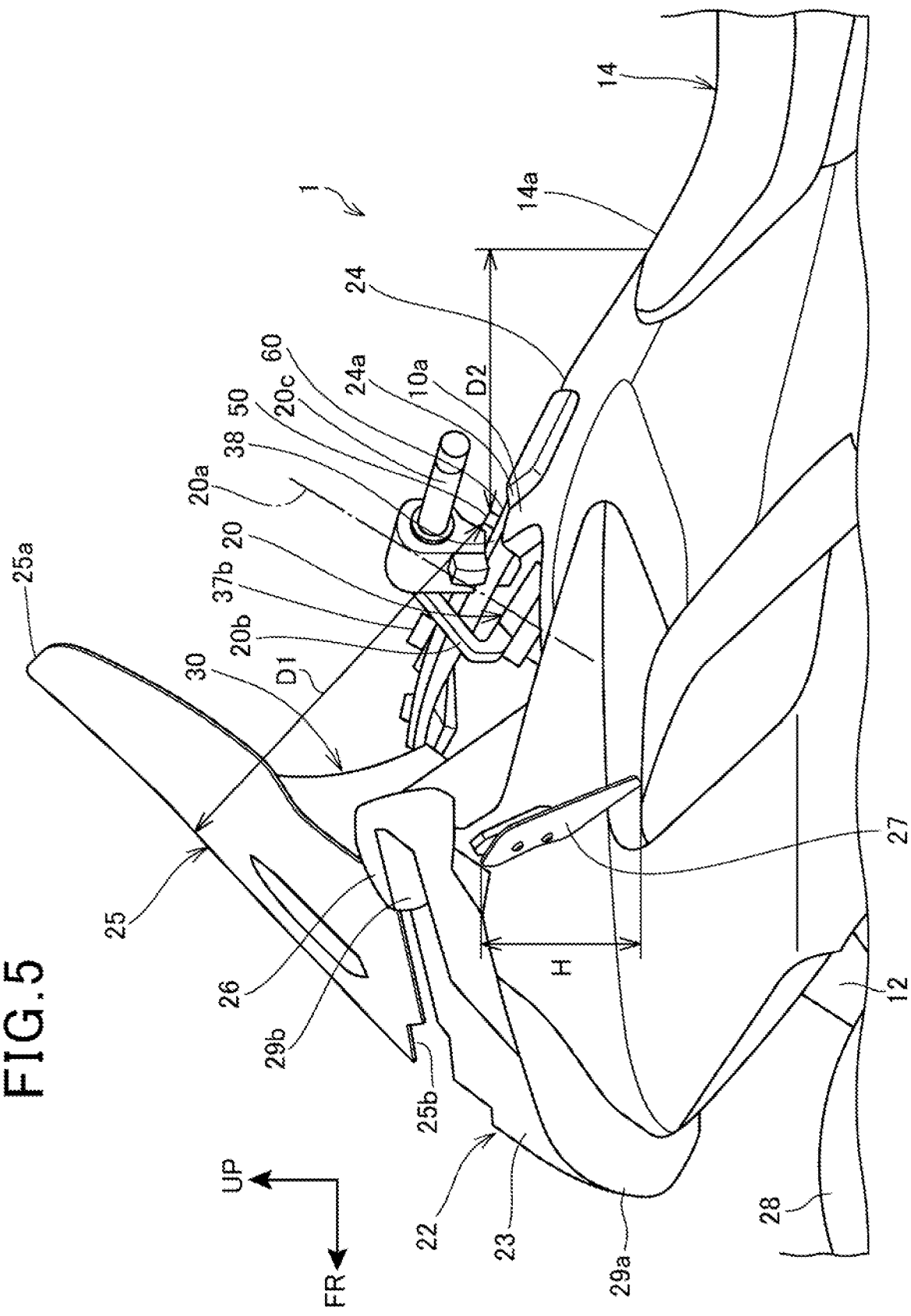
FIG. 5 is a left side view of the front portion of the two-wheeled motor vehicle.

FIG. 5 is a left side view of the front portion of the two-wheeled motor vehicle 1.

With reference to FIGS. 2, 3, and 5, the windscreen 25 is a plate-shaped member tilted upward and rearward when seen from the side of the vehicle, and a rear end portion 25a of the windscreen 25 is an upper end portion of the windscreen 25. The entire windscreen 25 is bent to curve forward when seen from above. The windscreen 25 is located above the front cover 23 and extends upward and rearward continuously from a front surface of the front cover 23.

The display portion 30 is placed rearward of the windscreen 25 and is covered by a lower portion of the windscreen 25 from the front. The display portion 30 is placed forward of the rear end portion 25a of the windscreen 25 when seen from the side of the vehicle and is located inside the windscreen 25.

The handlebar 20 is placed rearward of the windscreen 25 and the display portion 30. The left and right grip portions 20c of the handlebar 20 extend outward of the windscreen 25 in the vehicle width direction. The grip portions 20c are at substantially the same height as a lower end portion 25b of the windscreen 25 in a height direction of the two-wheeled motor vehicle 1.

The operation-portion support portion 38 and the center cover 24 form a tilted portion 60 tilted downward and rearward when seen from the side of the vehicle. The tilted portion 60 is a downward slope that continues from the rear end portion of the display portion 30 to a front end portion 14a of the seat 14. The tilted portion 60 extends from the display portion 30 to the seat 14, passing above the middle portion of the handlebar 20 in the vehicle width direction. The tilted portion 60 is located at the middle of the vehicle width.

The microphone 50 is placed rearward of the windscreen 25 and at the middle of the vehicle width. The microphone 50 is spaced apart from the display portion 30 and placed rearward of the display portion 30.

The microphone 50 is placed rearward of the handlebar 20 and forward of and above the seat 14 and placed on an upper surface of the vehicle body front portion 10a.

The microphone 50 is placed on the tilted portion 60. The microphone 50 is located below the display portion 30 because the microphone 50 is placed on the tilted portion 60, which is tilted downward and rearward. The microphone 50 is placed below the lower end portion 25b of the windscreen 25 and rearward of the rear end portion 25a of the windscreen 25.

Specifically, the microphone 50 is placed in the operation-portion support portion 38, which forms the tilted portion 60, and the microphone 50 is placed rearward of the operator 37b and the press operation portion 37a.

The operator 37b and the microphone 50 are both located in a middle portion of the two-wheeled motor vehicle 1 in the vehicle width, and the operator 37b is located forward of the microphone 50 and extends higher than the microphone 50. That is, the height of the operator 37b is greater than the height of the microphone 50.

The microphone 50 is placed rearward of the steering shaft 20a of the handlebar 20 and below the grip portions 20c when seen from the side of the vehicle. The microphone 50 is placed between the left and right grip portions 20c and in a middle portion of the vehicle width.

The microphone 50 is located rearward of the wind deflectors 27 and within widths H of the wind deflectors 27 in the height direction when seen from the side of the vehicle. At least a part of the microphone 50 may be located within the widths H.

Since the windscreen 25 is tilted upward and rearward when seen from the side of the vehicle, a direction normal to the plate-shaped windscreen 25 is a direction tilted downward and rearward.

With reference to FIG. 5, a distance D2 between the microphone 50 and the front end portion 14a of the seat 14 in a horizontal direction is smaller than a distance D1 between the windscreen 25 and the microphone 50 in the direction normal to the windscreen 25. That is, the microphone 50 is closer to the seat 14 than to the windscreen 25. The distance D1 is a distance between a middle portion of the windscreen 25 in the vehicle width direction and the microphone 50. The distance D2 is a distance between the microphone 50 and a middle portion of the front end portion 14a in the vehicle width direction.

Figure 6:
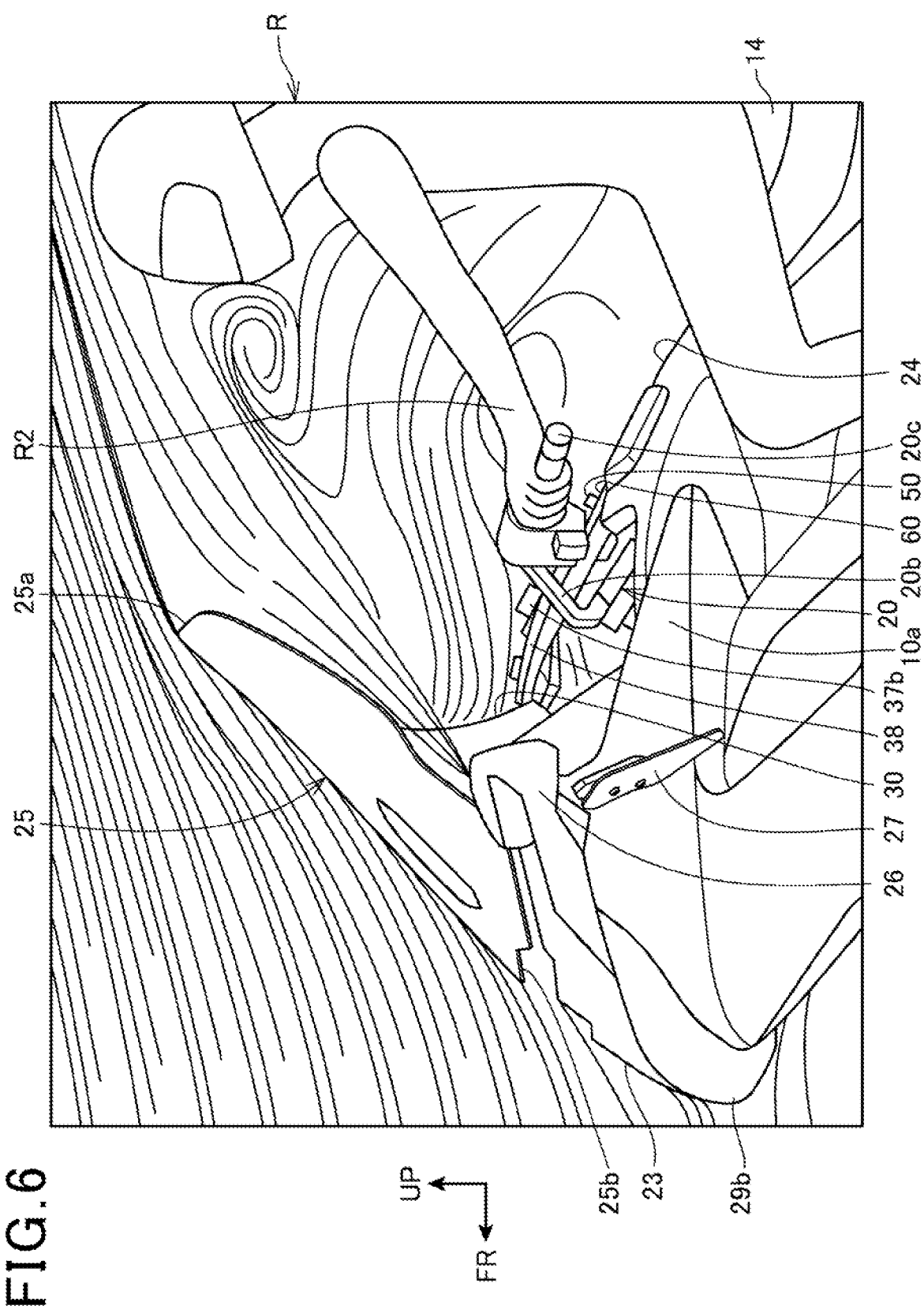
FIG. 6 is a left side view of the two-wheeled motor vehicle, showing a condition of an air stream during travel of the two-wheeled motor vehicle.

FIG. 6 is a left side view of the two-wheeled motor vehicle 1, showing a condition of an air stream during travel of the two-wheeled motor vehicle 1. In FIG. 6, the flow of the air stream is depicted by lines. In FIG. 6, the air stream is strong in places where the lines showing the flow of the air stream have a high density.

With reference to FIGS. 2, 3, 5, and 6, the air stream comes into contact with a front surface of the two-wheeled motor vehicle 1 during travel of the two-wheeled motor vehicle 1 and flows upward and rearward along the windscreen 25. This results in a weakened air stream behind the windscreen 25, and thus the weakened air stream comes in contact with the rider on the seat 14, the display portion 30, the handlebar 20, the central operation portion 37, and the microphone 50.

The microphone 50 is located forward of the seat 14 and rearward of the display portion 30; thus, the microphone 50 is close to a rider R on the seat 14 and thereby can capture the speech of the rider R easily. The air stream weakened by the windscreen 25 comes in contact with the microphone 50, resulting in reduction in noise in the microphone due to the air stream, so that the microphone 50 can capture the speech of the rider R favorably.

Since the display portion 30 is placed forward of the microphone 50, the display portion 30 is located forward of the rider on the seat 14 and is spaced apart from the rider R. Thus, the display portion 30 is easily visible to the rider R. Specifically, when the rider R is looking ahead, the rider R can see the display portion 30 with a small eye movement.

The air stream is particularly weakened in the middle portion in the vehicle width behind the windscreen 25. Since the microphone 50 is placed in the middle portion in the vehicle width, noise in the microphone 50 due to the air stream can be reduced.

The microphone 50 is placed below the lower end portion 25b of the windscreen 25 and rearward of the rear end portion 25a of the windscreen 25, where the air stream during travel is weakened. Thus, noise in the microphone 50 due to the air stream can be reduced.

The air stream is weakened around the tilted portion 60, which extends downward and rearward. Since the microphone 50 is placed on the tilted portion 60, noise in the microphone 50 due to the air stream is reduced.

The middle portion of the handlebar 20 in the vehicle width direction, which is located forward of the microphone 50, serves as a shield against wind for the microphone 50.

In addition, arms R2 of the rider R extending toward the respective left and right grip portions 20c of the handlebar 20 are located above the microphone 50 and outward of the microphone 50 in the vehicle width direction. Thus, the arms R2 of the rider R are available as shields against wind for the microphone 50.

The operator 37b, which is located forward of the microphone 50 and stands higher than the microphone 50, can also serve as a shield against wind for the microphone 50.

The wind deflectors 27 are located forward of the microphone 50 and outward of the microphone 50 in the vehicle width direction, and the microphone 50 is located within the widths H of the wind deflectors 27 in the height direction. Thus, the wind deflectors 27 serve as shields against wind not only for the rider R but also for the microphone 50.

As described above, in the embodiment according to the present invention, the two-wheeled motor vehicle 1 includes: the microphone 50 for capturing sound, the microphone 50 being located forward of the seat 14 for a rider; the display portion 30 for displaying a condition of the vehicle; and the handlebar 20 for steering the front wheel 2, and the microphone 50 is spaced apart from the display portion 30 and located rearward of the display portion 30.

In this configuration, the microphone 50 is spaced apart from the display portion 30 and located rearward of the display portion 30, thus, the microphone 50 is close to the rider R on the seat 14 and can thereby capture the speech of the rider R easily. Furthermore, the display portion 30 is spaced apart from the microphone 50 and placed forward of the microphone 50, thus, the display portion 30 is easily visible to the rider R.

Furthermore, the two-wheeled motor vehicle 1 includes the windscreen 25 having a plate shape and located forward of the display portion 30, and the distance D2 between the microphone 50 and the seat 14 in the horizontal direction is smaller than the distance D1 between the windscreen 25 and the microphone 50 in the direction normal to the windscreen 25.

In this configuration, the distance D1 between the windscreen 25 and the microphone 50 can be increased, so that the air stream flowing along the windscreen 25 during travel has a reduced effect on the microphone 50 capturing sound. Thus, the microphone 50 can capture the speech of the rider R easily.

Furthermore, the handlebar 20 includes the grip portions 20c to be held by the rider R, and the microphone 50 is located rearward of the steering shaft 20a of the handlebar 20 and below the grip portions 20c when seen from the side of the vehicle.

In this configuration, the handlebar 20 and the arms R2 of the rider holding the grip portions 20c are available as shields against wind and can inhibit air stream noise from being captured by the microphone 50.

Furthermore, the tilted portion 60 tilted downward and rearward is provided, and the microphone 50 is located in the tilted portion 60.

In this configuration, the air stream is weakened at the tilted portion 60, which is tilted downward and rearward. Thus, placing the microphone 50 in the tilted portion 60 can inhibit noise due to the air stream and thereby facilitate the microphone 50 capturing the speech of the rider R.

Furthermore, the microphone 50 is located in the middle portion of the two-wheeled motor vehicle 1 in the vehicle width direction.

In this configuration, the middle portion in the vehicle width direction is not susceptible to the air stream, and thus, placing the microphone 50 in the middle portion in the vehicle width direction can inhibit noise due to the air stream.

Furthermore, the operator 37b extending upward is located forward of the microphone 50, and the height of the operator 37b is greater than the height of the microphone 50.

In this configuration, the operator 37b is available as a shield against wind for the microphone 50 and can inhibit noise due to the air stream.

Furthermore, the wind deflectors 27 extending outward in the vehicle width direction are located forward of the microphone 50, and the microphone 50 is located within the widths H of the wind deflectors 27 in the height direction when seen from the side of the vehicle.

In this configuration, the wind deflectors 27 are available as shields against wind for the microphone 50 and can inhibit noise due to the air stream.

Furthermore, the handlebar 20 is configured to be steered left and right relative to the vehicle body front portion 10a located forward of the seat 14, and the microphone 50 is supported by the vehicle body front portion 10a.

In this configuration, the position of the microphone 50 is not changed by the handlebar 20 being steered left and right, so that the microphone 50 can capture the speech of the rider R stably.

Furthermore, the microphone 50 is located below the lower end portion 25b of the windscreen 25 and rearward of the rear end portion 25a of the windscreen 25.

In this configuration, the air stream flowing along the windscreen 25 during travel is inhibited from reaching the microphone 50, so that noise due to the air stream can be inhibited.

The foregoing embodiment describes one aspect of the present invention, and the present invention is not limited to the embodiment.

While the microphone 50 is used to recognize the speech of a rider to operate the two-wheeled motor vehicle 1 in the embodiment, this is not a limitation. The microphone 50 may be used to capture the speech of a rider to talk to another person through wireless communication.

While the tilted portion 60 is a part of the vehicle body cover 22 in the embodiment, this is not a limitation. The tilted portion 60 may be, for example, an upper surface portion of the fuel tank, the upper surface portion extending downward and rearward.

While the two-wheeled motor vehicle 1 is described in the embodiment as an example, this is not a limitation on the present invention. The present invention is applicable to a three-wheeled saddle-ride type vehicle including two front wheels or two rear wheels, and a saddle-ride type vehicle including four or more wheels.

REFERENCE SIGNS LIST 1 two-wheeled motor vehicle (saddle-ride type vehicle)
2 front wheel
10a vehicle body front portion 14 seat
20 handlebar
20a steering shaft
20c grip portion
25 windscreen
25a rear end portion
25b lower end portion
27 wind deflector
30 display portion
37b operator
50 microphone
60 tilted portion
D1 distance (between windscreen and microphone)
D2 distance (between microphone and seat)
H width

The invention claimed is:

1. A saddle-ride type vehicle comprising:
a front cover and a windscreen that are at a front portion of a vehicle body cover covering a vehicle body, the front cover covering an upper portion of a steering system and a front end portion of a vehicle body frame from a front and from sides, the windscreen having a plate shape and being tilted upward and rearward when seen from a side of the vehicle;
a display portion and a center cover that are behind the front cover, the display portion displaying a condition of the vehicle, the center cover covering a portion of the vehicle body between a handlebar that steers a front wheel and a seat for a rider from above and from the sides; and
an operation-portion support portion having a plate shape and provided between the display portion and the center cover, wherein
the operation-portion support portion connects to a rear end portion of the display portion, covers a steering shaft from above and connects to the center cover; and
a microphone capturing sound and located forward of the seat for the rider is spaced apart from and rearward of the display portion, and is located on the operation-portion support portion so that a distance between the microphone and the seat in a horizontal direction is smaller than a distance between the windscreen and the microphone in a direction normal to the windscreen.

2. The saddle-ride type vehicle according to claim 1, wherein the handlebar includes grip portions to be held by the rider, and
the microphone is located rearward of the steering shaft of the handlebar and below the grip portions when seen from a side of the vehicle.

3. The saddle-ride type vehicle according to claim 1, wherein a tilted portion tilted downward and rearward is provided, and the microphone is located in the tilted portion.

4. The saddle-ride type vehicle according to claim 1, wherein the microphone is located in a center portion of the saddle-ride type vehicle in a vehicle width direction.

5. The saddle-ride type vehicle according to claim 1, wherein an operator extending upward is located forward of the microphone, and a height of the operator is greater than a height of the microphone.

6. The saddle-ride type vehicle according to claim 1, wherein a wind deflector extending outward in a vehicle width direction is located forward of the microphone, and
the microphone is located within a width of the wind deflector in a height direction when seen from a side of the vehicle.

7. The saddle-ride type vehicle according to claim 1, wherein the handlebar is configured to be steered left and right relative to a vehicle body front portion located forward of the seat, and the microphone is supported by the vehicle body front portion.

8. The saddle-ride type vehicle according to claim 1, wherein the microphone is located below a lower end portion of the windscreen and rearward of a rear end portion of the windscreen.

* * * * *